United States Patent Office 3,322,753
Patented May 30, 1967

3,322,753
OXIDATION OF CERTAIN 5-PHENYL-1,4-BENZODIAZEPINONES
Rodney Ian Fryer, North Caldwell, and Leo Henryk Sternbach, Upper Montclair, N.J., assignors to Hoffmann-La Roche Inc., Nutley, N.J.
No Drawing. Filed June 18, 1965, Ser. No. 465,159
5 Claims. (Cl. 260—239.3)

This application is a continuation-in-part of our application Ser. No. 294,142, filed July 10, 1963, now U.S. Patent No. 3,247,187.

This invention relates to the oxidation of 1,4-benzodiazepines. Products obtainable by the process of this invention are known compounds and are useful as sedatives, tranquilizers, anticonvulsants and muscle relaxants. More particularly, the present invention relates to the oxidation of 5-phenyl-1,4-benzodiazepines.

In one aspect, the present invention relates to a method for the preparation of a compound selected from the group consisting of compounds of the formulae

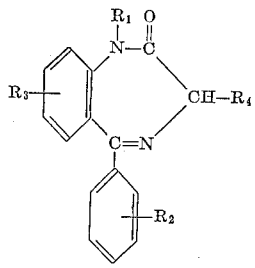

(I)

and

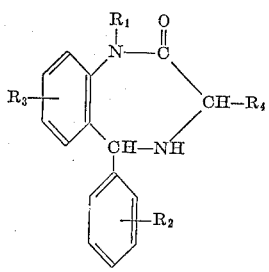

(II)

wherein, $R_1$ and $R_4$ are each selected from the group consisting of hydrogen and lower alkyl; and $R_2$ and $R_3$ are each selected from the group consisting of hydrogen, halogen, nitro, lower alkyl and trifluoromethyl;

which comprises the oxidation of a compound selected from the group consisting of compounds of the formulae

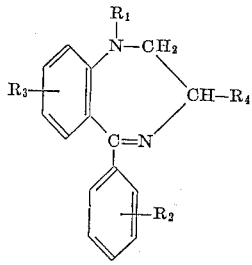

(III)

and

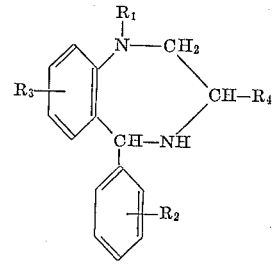

(IV)

wherein $R_1$, $R_2$, $R_3$ and $R_4$ have the same meaning as above.

In a second aspect, the present invention relates to a method for the preparation of a compound of the formula

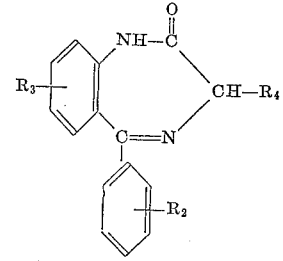

(V)

wherein $R_2$ and $R_3$ are each selected from the group consisting of hydrogen, halogen, trifluoromethyl, lower alkyl and nitro; and $R_4$ is selected from the group consisting of hydrogen and lower alkyl;

which comprises the oxidation of a compound of the formula

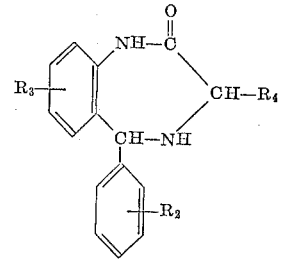

(VI)

wherein $R_2$, $R_3$ and $R_4$ have the same meaning as above.

As used herein the term "lower alkyl" relates to both straight and branched chain saturated hydrocarbon groups, for example, methyl, ethyl, propyl, isopropyl and the like. The term "halogen" relates to all four halogens, i.e. iodine, fluorine, bromine and chlorine. Moreover, chlorine, fluorine and bromine are preferred. In the above formulae, $R_2$ is preferably either hydrogen or a substituent in the ortho-position, and is preferably trifluoromethyl, fluorine or chlorine. $R_3$ is preferably in the 7-position of the benzodiazepine moiety and is preferably chlorine, fluorine, bromine, nitro or trifluoromethyl. In another preferred aspect, $R_1$ is hydrogen or methyl.

In one aspect of the present invention a compound of Formula III is oxidized to a compound of Formula I or a compound of Formula IV is oxidized to a compound of Formula II. These oxidations both result in the introduction of oxygen into the 2-position of a 5-phenyl-1,4-benzodiazepine molecule. This result is suitably effected by means of an agent containing in combination with oxygen, a metal at valence higher than its principal valence, said metal being selected from the group consisting of vanadium, chromium, manganese and lead. By prin-

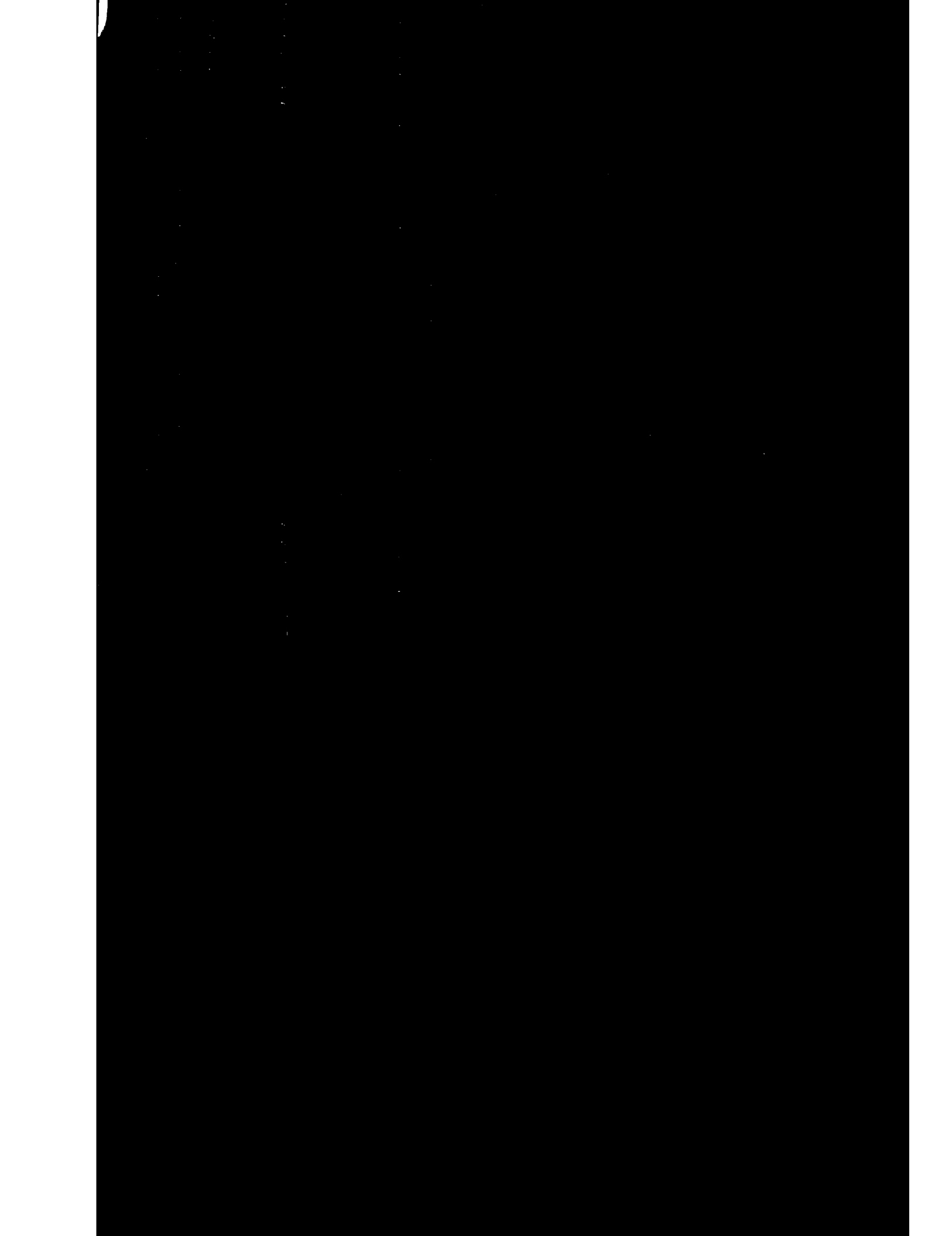

benzodiazepin-2-one was reacted with chromium trioxide in glacial acetic acid. The reaction time was 3½ hours. There was thus obtained 7-chloro-1,3-dihydro-5-(2-fluorophenyl)-2H-1,4-benzodiazepin - 2 - one melting at 205–206°.

*Example 5*

According to the procedure of Example 1 above, 5-(4-chlorophenyl) - 1,3,4,5 - tetrahydro - 2H - 1,4-benzodiazepin-2-one was reacted with chromium trioxide in glacial acetic acid. The reaction time was 12 hours. There was thus obtained 5-(4-chlorophenyl)-1,3-dihydro-2H-1,4-benzodiazepin-2-one melting at 268–271° (dec.).

The above starting material, 5-(4-chlorophenyl)-1,3,4,5-tetrahydro-2H-1,4-benzodiazepin-2-one and its method of preparation are not a part of this invention but such are disclosed hereinbelow in order that this disclosure may be complete.

A suspension of 1 g. of platinum oxide in 500 ml. of acetic acid was reduced to completion with hydrogen. A solution of 15.0 g. of 5-(4-chlorophenyl)-1,3-dihydro-2H-1,4-benzodiazepin-2-one in 500 ml. of acetic acid was then added thereto and the mixture reduced to completion. Hydrogen uptake stopped at 1.3 l., the catalyst was filtered over a filter aid (Celite) and the filtrate concentrated under reduced pressure to an oil. The residue was crystallized from a mixture of acetone and petrol to give 5-(4-chlorophenyl) - 1,3,4,5 - tetrahydro - 2H - 1,4-benzodiazepin-2-one as white prisms melting at 190–195°.

*Example 6*

According to the procedure of Example 1 above, 5-(3-nitrophenyl) - 1,3,4,5-tetrahydro - 2H - 1,4-benzodiazepin-2-one was reacted with chromium trioxide in glacial acetic acid. The reaction time was 12 hours. There was thus obtained 1,3-dihydro-5-(3-nitrophenyl)-2H-1,4-benzodiazepin-2-one melting at 224–227°.

The above starting material, 5-(3-nitrophenyl)-1,3,4,5-tetrahydro-2H-1,4-benzodiazepin-2-one and its method of preparation are not a part of this invention but such are disclosed hereinbelow in order that this disclosure may be complete.

A solution of 34 g. of 5 phenyl-1,3,4,5-tetrahydro-2H-1,4-benzodiazepin-2-one in 100 ml. of concentrated sulfuric acid was cooled to approximately −30° in a Dry Ice acetone bath. A solution of 7 ml. of 90 percent nitric acid in 20 ml. of concentrated sulfuric acid was then added slowly thereto, keeping the temperature constant. The reaction mixture was then allowed to warm to room temperature and was stirred overnight. The solution was then cooled to −10° and carefully made basic (pH 8) at this temperature with ammonium hydroxide. The product was extracted into dichloromethane which was washed, dried and evaporated. The residue was dissolved in methanol and the resultant crystals of 5-(4-nitrophenyl)-1,3,4,5-tetrahydro-2H-1,4-benzodiazepin-2-one melting at 222–228° filtered off. The mother liquors were then concentrated and the residue dissolved in 75 ml. of acetone. Addition of 25 ml. of 11.5 N methanolic hydrogen chloride precipitated 5-(3-nitrophenyl)-1,3,4,5 - tetrahydro-2H-1,4-benzodiazepin-2-one as the hydrochloride which was removed by filtration and recrystallized from methanol and melted at 285–300°. Free base was liberated with 3 N sodium hydroxide solution and extracted into methylene chloride. The methylene chloride layer was washed, dried and evaporated to give, after recrystallization from methanol, 5-(3-nitrophenyl) - 1,3,4,5-tetrahydro-2H-1,4-benzodiazepin-2-one as white needles melting at 158–160°.

*Example 7*

According to the procedure of Example 1 above, 1,3,4,5 - tetrahydro - 5-(4-nitrophenyl)-2H-1,4-benzodiazepin-2-one was reacted with chromium trioxide in glacial acetic acid. The reaction time was 12 hours. There was thus obtained 1,3 - dihydro - 5 - (4-nitrophenyl)-2H-1,4-benzodiazepin-2-one melting at 279–281°.

The starting material 1,3,4,5-tetrahydro-5-(4-nitrophenyl)-2H-1,4-benzodiazepin-2-one and its method of preparation are not a part of this invention but such are disclosed in Example 6 above in order that this disclosure may be complete.

*Example 8*

According to the procedure of Example 1 above, 7-fluoro - 1,3,4,5 - tetrahydro - 5 - (4-chlorophenyl)-2H-1,4-benzodiazepin-2-one was reacted with chromium trioxide in glacial acetic acid. The reaction time was 12 hours. There was thus obtained 7-fluoro-1,3-dihydro-5-(4-chlorophenyl)-2H-1,4-benzodiazepin-2-one melting at 230–232°.

The starting material 7-fluoro-1,3,4,5-tetrahydro-5-(4-chlorophenyl)-2H-1,4-benzodiazepin-2-one and its method of preparation are not a part of this invention but such are disclosed hereinbelow in order that this disclosure may be complete.

A mixture of 111 g. of p-fluoroaniline and 392 g. of p-chlorobenzoyl chloride was gradually heated to 150°. When the initial reaction had subsided, 174 g. of zinc chloride was added and the temperature of the reaction mixture was raised to 220°. The reaction mixture was maintained at 210–220° for 40 minutes and was then quenched by the careful addition of 500 ml. of 3 N hydrochloric acid. The hot acid was decanted and the residue was hydrolyzed by heating for 36 hrs. under reflux with a mixture of 650 ml. of concentrated sulfuric acid, 500 ml. of acetic acid and 350 ml. of water. The acid solution was cooled, diluted with water and brought to pH 8 with sodium hydroxide. The ketone was extracted into dichloromethane which was washed with 1 N hydrochloric acid and then with water. The organic layer was dried and concentrated. The product was crystallized from ligroin (B.P. 100–120) to give 2-amino-4'-chloro-5-fluorobenzophenone as yellow prisms melting at 97–98°.

A solution of 62.5 g. of bromoacetyl bromide in 27 ml. of benzene was added over a period of 40 minutes to a stirred and heated solution of 64.6 g. of 2-amino-4'-chloro-5-fluorobenzophenone in 300 ml. of benzene. After the addition was complete the mixture was heated under reflux for 1 hr. and then poured into 1 l. of water. The layers were separated and the organic layer was washed with a 20 percent aqueous solution of sodium carbonate and then with water until the washings were neutral. Removal of the solvent and recrystallization of the residue from methanol gave 2 - bromo-2'-(4-chlorobenzoyl)-4'-fluoroacetanilide as white needles melting at 144–145°.

A solution of 55.1 g. of 2-bromo-2'-(4-chlorobenzoyl)-4'-fluoroacetanilide in 200 ml. of dichloromethane was carefully added to 300 ml. of liquid ammonia. The mixture was allowed to stand for 30 minutes and then the ammonia was evaporated. The dichloromethane solution was washed with water, dried and concentrated to a gum, which was dissolved in 150 ml. of ethanol and heated under reflux for 2 hrs. The solution was cooled and the product, 5 - (4 - chlorophenyl)-1,3-dihydro-7-fluoro-2H-1,4-benzodiazepin-2-one melting at 232–233°, was obtained by filtration.

A solution of 10 g. of 5-(4-chlorophenyl)-1,3-dihydro-7-fluoro-2H-1,4-benzodiazepin-2-one in a mixture of 100 ml. of acetic acid and 15 ml. of water was hydrogenated to completion over a platinum catalyst (100 mg. of platinum oxide). The catalyst was removed by filtration and the filtrate was evaporated under reduced pressure. The residue was dissolved in dichloromethane which was then washed with a 20 percent aqueous solution of sodium carbonate and then with water until the washings were alkali free. The organic layer was dried and evaporated. The residual gum was crystallized from an acetone, hexane mixture to give 5-(4-chlorophenyl)-1,3,4,5-tetrahydro-7-fluoro-2H-1,4-benzodiazepin-2-one as white prisms melting at 178–179°.

Example 9

A solution of 1.0 g. of 2,3-dihydro-7-nitro-5-phenyl-1H-1,4-benzodiazepine in 250 ml. of purified acetone was treated under an atmosphere of dry nitrogen with 0.936 ml. of chromate reagent (the acetone was purified and the chromate reagent prepared according to the method of Djerassi et al., J. Org. Chem. 21: 1547 (1956)). The mixture was heated and allowed to reflux for 1 hour and then poured into 1.5 l. of cold water. The product was extracted into dichloromethane and the extract was washed and concentrated. Recrystallization of the residue from methanol gave a first crop of prisms of unreacted starting material A second group of prisms was treated with ether and the ether soluble portion was crystallized to yield 1,3 - dihydro-7-nitro-5-phenyl-2H-1,4-benzodiazepin-2-one melting at 224–226°.

Example 10

A solution of 1.0 g. of 2,3-dihydro-7-nitro-5-phenyl-1H-1,4-benzodiazepine in 15 ml. of glacial acetic acid was treated at room temperature with 0.936 ml. of chromate reagent (prepared in the same manner as the chromate reagent used in Example 9) and stirred for 30 minutes. The mixture was then poured into 800 ml. of water, made basic with ammonium hydroxide and extracted with dichloromethane. The organic layers were then combined, washed, dried and filtered over neutral alumina (Woelm Grade I). The alumina was eluted with dichloromethane and washed with methanol. The solvent was then removed and the residue recrystallized giving 1,3-dihydro-7-nitro-5-phenyl-2H-1,4-benzodiazepin-2-one melting at 224–226°.

Example 11

According to the procedure of Example 9 above, 7-chloro-2,3-dihydro-5-phenyl-1H-1,4 - benzodiazepine was reacted with chromium trioxide in dilute sulfuric acid and acetone. The reaction time was 3 hours and the product was 7-chloro-1,3-dihydro-5-phenyl-2H-1,4-benzodiazopin-2-one melting at 216–217°.

Example 12

According to the procedure of Example 10 above 2,3-dihydro-7-nitro-5-phenyl-1H-1,4-benzodiazepine was reacted with chromium trioxide in sulfuric acid and glacial acetic acid. The reaction time was 18 hours. There was thus obtained 1,3-dihydro-7-nitro-5-phenyl-2H-1,4-benzodiazepin-2-one melting at 224–226°.

Example 13

According to the procedure of Example 10 above, 2,3-dihydro-7 - trifluoromethyl-5-phenyl - 1H-1,4-benzodiazepine was reacted with chromium trioxide in sulfuric acid and glacial acetic acid. The reaction time was 30 minutes. The product was 1,3-dihydro-7-trifluoromethyl-5-phenyl-2H-1,4-benzodiazepin-2-one melting at 233–235°.

Example 14

According to the procedure of Example 9 above, 7-chloro-2,3-dihydro-1-methyl - 5 - phenyl-1H-1,4-benzodiazepine was reacted with chromium trioxide in dilute sulfric acid and acetone. The reaction time was 3 hours. There was thus obtained 7-chloro-1,3-dihydro-1-methyl-5-phenyl-2H-1,4-benzodiazepin-2-one melting at 130–131°.

Example 15

According to the procedure of Example 9 above 7-chloro-1-methyl-5-phenyl-1,3,4,5 - tetrahydro - 2H - 1,4-benzodiazepine was reacted with chromium trioxide in dilute sulfuric acid and acetone. The reaction time was 10 minutes. The reaction was conducted at room temperature. There was thus obtained 7-chloro-1-methyl-5-phenyl-1,3,4,5-tetrahydro - 2H-1,4-benzodiazepin-2 - one melting at 144–145°.

Example 16

A solution of 0.01 mole of 1,3,4,5-tetrahydro-5-(3-nitrophenyl)-2H-1,4-benzodiazepin-2-one in 200 ml. of glacial acetic acid was oxidized at room temperature with a solution of 0.075 mole of chromium trioxide in 2 ml. of water. The mixture was allowed to stand for 17 hours, diluted with water (0°) and made basic (pH 8) with ammonium hydroxide. The resulting product was extracted into dichloromethane, and the extract washed, dried, filtered and evaporated. The residue was then recrystallized from methanol giving 1,3-dihydro-5-(3-nitrophenyl)-2H-1,4-benzodiazepin-2-one as white prisms melting at 224–227°.

Example 17

5-(4-nitrophenyl - 1,3,4,5 - tetrahydro-2H-1,4-benzodiazepin-2-one was oxidized according to the procedure of Example 16 above yielding 1,3-dihydro-5-(4-nitrophenyl)-2H-1,4-benzodiazepin-2-one as pale yellow prisms melting at 279–281°.

Example 18

A solution of 2.1 g. of 2,3-dihydro-7-nitro-1H-1,4-benzodiazepine in a mixture of 50 ml. of pure acetone, 0.2 ml. of pyridine and 0.2 ml. of water was heated under reflux while 5.0 g. of potassium permanganate was added portionwise. The resulting mixture was refluxed for 40 min., cooled, and filtered over a filter aid (Celite). Solvents were removed under reduced pressure and the residual oil was dissolved in chloroform and filtered over neutral activated alumina. Starting material was recovered from the chloroform eluent and this solvent was used until no more material was obtained from the alumina. By changing the solvent to methanol, 1,3-dihydro-7-nitro-5-phenyl-2H-1,4-benzodiazepin-2-one was obtained, M.P. 223–225°.

What is claimed is:

1. A method for the preparation of a compound of the formula

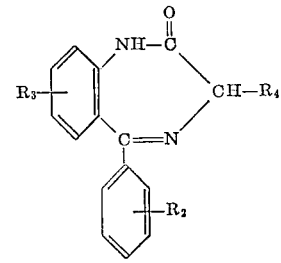

wherein $R_2$ and $R_3$ are each selected from the group consisting of hydrogen, trifluoromethyl, lower alkyl, halogen and nitro; and $R_4$ is selected from the group consisting of hydrogen and lower alkyl;

which comprises the oxidation of a compound of the formula

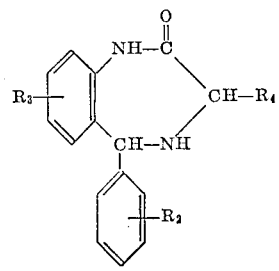

wherein $R_2$, $R_3$ and $R_4$ have the same meaning as above.

2. A method as in claim 1, wherein the oxidation is effected by means of an agent selected from the group consisting of chromic acid, mercuric acetate, mercuric oxide, selenium dioxide, manganese dioxide, ferric chloride, ferricyanide, and silver oxide.

3. A method as in claim 1, wherein the oxidation is effected by means of chromic acid.

4. A method as in claim 1, wherein the oxidation is effected by means of selenium dioxide.

5. A method as in claim 1, wherein the oxidation is effected by means of silver oxide.

No references cited.

WALTER A. MODANCE, *Primary Examiner.*

ROBERT T. BOND, *Assistant Examiner.*